(12) United States Patent
Motley et al.

(10) Patent No.: US 7,952,857 B1
(45) Date of Patent: May 31, 2011

(54) ARC-RESISTANT SWITCHGEAR ENCLOSURE WITH AMBIENT AIR VENTILATION SYSTEM

(76) Inventors: Gregory O. Motley, Murfreesboro, TN (US); Dale Waynick, Murfreesboro, TN (US); Eldridge R. Byron, Murfreesboro, TN (US); Abraham de la Cruz, Smyrna, TN (US)

( * ) Notice: Subject to any disclaimer, the term of this patent is extended or adjusted under 35 U.S.C. 154(b) by 0 days.

(21) Appl. No.: 12/709,942

(22) Filed: Feb. 22, 2010

(51) Int. Cl.
*H05K 7/20* (2006.01)
(52) U.S. Cl. .................. 361/678; 361/690; 454/184
(58) Field of Classification Search .................. None
See application file for complete search history.

(56) References Cited

U.S. PATENT DOCUMENTS

| | | | |
|---|---|---|---|
| 4,333,517 A | 6/1982 | Parro | 165/1 |
| 4,464,703 A | 8/1984 | Davies et al. | 361/342 |
| 5,124,881 A | 6/1992 | Motoki | 361/335 |
| 5,193,049 A | 3/1993 | Jackson | 361/379 |
| 5,220,955 A | 6/1993 | Stokes | 165/54 |
| 5,574,624 A | 11/1996 | Rennie et al. | 361/676 |
| 5,689,097 A | 11/1997 | Aufermann et al. | 218/157 |
| 5,767,440 A * | 6/1998 | Byron et al. | 174/17 VA |
| 5,801,331 A | 9/1998 | Zachrai | 174/52 |
| 5,803,803 A | 9/1998 | O'Dell et al. | 454/184 |
| 5,892,195 A | 4/1999 | Aufermann et al. | 218/157 |
| 6,025,983 A | 2/2000 | Uchida et al. | 361/606 |
| 6,041,851 A | 3/2000 | Diebel et al. | 165/104 |
| 6,062,665 A | 5/2000 | Schneider et al. | 312/265 |
| 6,141,192 A | 10/2000 | Garzon | 361/5 |
| 6,323,448 B1 | 11/2001 | Seymour et al. | 200/237 |
| 6,417,443 B1 * | 7/2002 | Smith | 174/17 VA |
| 7,236,352 B2 * | 6/2007 | Dalis | 361/608 |
| 7,418,995 B2 * | 9/2008 | Howard et al. | 165/80.3 |
| 7,586,738 B1 * | 9/2009 | Hartzel et al. | 361/676 |
| 7,813,129 B2 * | 10/2010 | Van Der Werff | 361/695 |
| 2009/0200273 A1 | 8/2009 | Josten et al. | 218/157 |

OTHER PUBLICATIONS

IEEE Guide for Testing Metal-Enclosed Switchgear Rated Up to 38 kV for Internal Arcing Faults 48 pages, Jan. 18, 2008.

* cited by examiner

*Primary Examiner* — Boris L Chervinsky (57) ABSTRACT

An arc-resistant enclosure for electrical switchgear which includes solid front and back walls, a pair of solid side walls joined to the front and back walls, a ventilated roof joined to the side walls and the front and back walls, and a ventilated base joined to the side walls and the front and back walls. Internal partitions divide the space enclosed by the front, back, side, top and bottom walls into multiple compartments for housing different types of components. The ventilated base forms air-intake ports for admitting ambient air into a plurality of the compartments, and the ventilated roof forms air-exhaust ports for allowing air to be exhausted from the compartments. As air inside the enclosure is heated by the switchgear, the hot air rises through the switchgear compartments and is exhausted through the top air-exhaust ports, and replacement ambient air is drawn into the bottoms of the compartments through the air-intake ports.

16 Claims, 8 Drawing Sheets

ARC-RESISTANT SWITCHGEAR ENCLOSURE WITH AMBIENT AIR VENTILATION SYSTEM

FIELD OF THE INVENTION

The present invention relates generally to electrical switchgear enclosures and, more particularly, to arc-resistant electrical switchgear enclosures having ambient air ventilation systems.

BACKGROUND OF THE INVENTION

Switchgear enclosures are commonly employed in electrical power distribution systems for enclosing circuit breakers and other switching equipment associated with the distribution system. Typically, switchgear enclosures are comprised of a number of individual stacked or adjacent compartments, and receive electrical power from a power source and distribute is the electrical power through one or more feeder circuits to one or more loads. Switchgear enclosures typically include circuit protection device for interrupting electric power in a particular feeder circuit in response to hazardous current overloads in the circuit. A circuit protection device in electrical equipment can be a circuit breaker, fuse and switch combination, contactor and fuse combination or any other device intended to break or protect the load or secondary side of a circuit.

Switchgear is a general term covering switching and interrupting devices and their combination with associated control, instruments, metering, protective and regulating devices, and assemblies of these devices with associated interconnections, accessories, and supporting structures used primarily in connection with the generation, transmission, distribution, and conversion of electric power. Switchgear characteristics are described in ANSI/IEEE Standard No. C37.20.1, C37.20.2, C37.20.3-1999. However, the present invention can be used in many other types of electrical equipment where arc resistance is required.

The specified temperature limits applicable to switchgear assemblies are given in the above referenced standards. The rated continuous current of metal-enclosed (ME) switchgear is the maximum current that can be carried continuously by the primary circuit components, including buses and connections, without producing a temperature in excess of specified limits for any primary or secondary circuit component, any insulating medium, or any structural or enclosing member. The continuous current ratings of the main bus in ME switchgear are also defined by the above referenced standards. The short-time current ratings of the individual circuit-breaker compartments of ME switchgear are equal to the short-time ratings of the switching and protective devices used, or the short-time rating of the current transformers (see ANSI/IEEE C57.13-1993).

In addition to current overloads, switchgear enclosures may encounter other hazardous conditions known as arcing faults. Arcing faults occur when electric current "arcs," flowing through ionized gas between conductors, such as between two ends of broken or damaged conductors, or between a conductor and ground in a switchgear enclosure. Arcing faults typically result from corroded, worn or aged wiring or insulation, loose connections and electrical stress caused by repeated overloading, lightning strikes, etc. Particularly in medium- to high-voltage power distribution systems, the ionized gases associated with arcing faults may be released at pressures and temperatures sufficient to damage the switchgear equipment and cause deadly harm to anyone in close proximity.

Presently, the most commonly employed method for enhancing the durability of switchgear enclosures in the event of arcing faults is to provide arc-resistant switchgear that meets switchgear standards, with a means for venting the gases from the compartment in which an arcing fault occurs. These compartments are designed to withstand the pressures and temperatures of the gases associated with an arcing fault and reduce the likelihood or extent of damage to the switchgear. This control of the explosion exhaust is what provides the increased safety to personnel working around the equipment.

Meeting the temperature limits in arc-resistant switchgear enclosures becomes more difficult as the current rating of the switchgear increases, and it becomes necessary to use air ventilation systems to maintain the required temperatures. For example, air intake and exhaust openings may be provided in the front and rear walls of a switchgear enclosure, along with automatic closure mechanisms to close such openings when an arcing fault occurs inside the enclosure. These closure mechanisms can add to the cost of switchgear enclosures, and can also introduce reliability issues in preventing an arc exhaust.

SUMMARY

In one embodiment, an arc-resistant enclosure for electrical switchgear includes solid front and back walls, a pair of solid side walls joined to the front and back walls, a top wall joined to the side walls and the front and back walls, and a bottom wall joined to the side walls and the front and back walls. Internal partitions divide the space enclosed by the front, back, side, top and bottom walls into multiple compartments for receiving different types of switchgear. The bottom wall forms air-intake ports for admitting ambient air into a plurality of the compartments, and the top wall forms air-exhaust ports for allowing air to be exhausted from the compartments. An ambient air manifold below the bottom wall conducts ambient air to the air-intake ports in the bottom wall. As air inside the enclosure is heated by the electric paths within the switchgear, the hot air rises through the switchgear compartments and is exhausted through the top air-exhaust ports, and replacement ambient air is drawn into the bottom of the compartments through the air-intake ports.

In another embodiment, the compartments of the arc-resistant enclosure include a circuit protection device compartment, a cable compartment, and a main bus compartment between said circuit protection device compartment and cable compartments. An ambient air manifold conducts ambient air to the lower regions of all the compartments, and the top wall forms air-exhaust ports for allowing air to be exhausted from the compartments. In one implementation, a is portion of the cable compartment extends under the main bus compartment to be directly adjacent the circuit protection device compartment, and the ambient air manifold includes a pair of conduits located adjacent the front and back walls of the portion of the cable compartment extending under the main bus compartment to supply ambient air to the bottom of the main bus compartment. This arrangement permits the main bus compartment to be cooled with ambient air even though that compartment is located between, and isolated from, the other two compartments.

BRIEF DESCRIPTION OF THE DRAWINGS

The advantages of the present disclosure will become apparent upon reading the following detailed description and upon reference to the drawings, in which.

While the invention is susceptible to various modifications and alternative forms, is specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Figure 1:
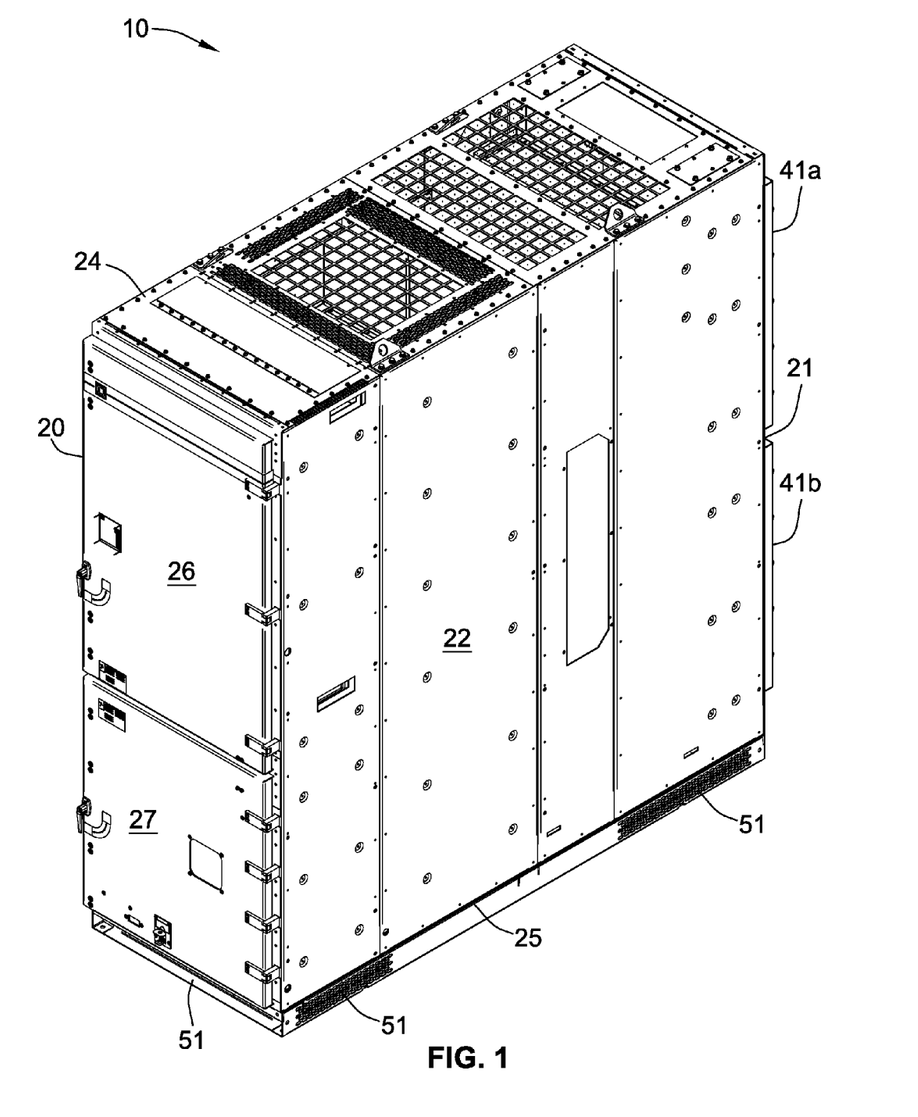
FIG. 1 is a perspective view of an arc-resistant switchgear enclosure equipped with an ambient air ventilation system.
Figure 2:
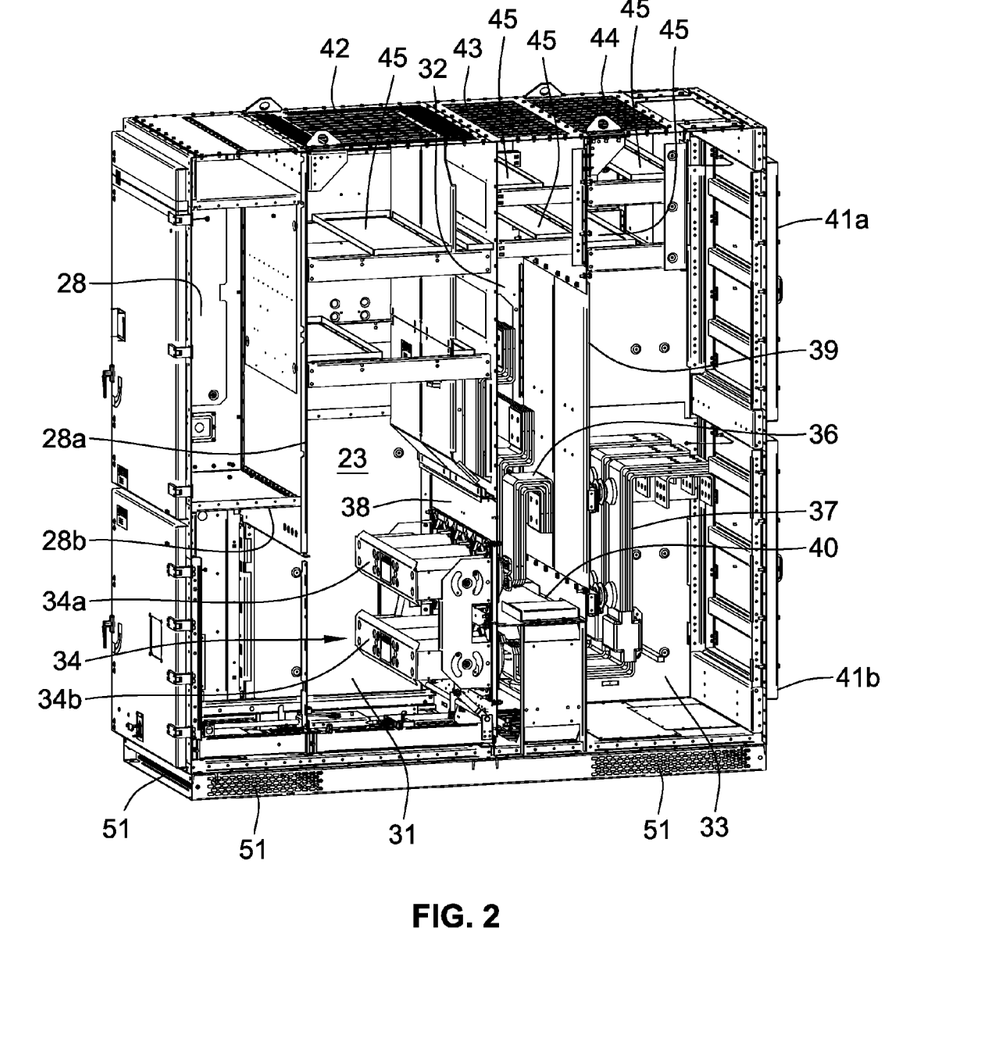
FIG. 2 is the perspective view similar to that of FIG. 1 with the near side panel removed to reveal the internal structure.
Figure 3:
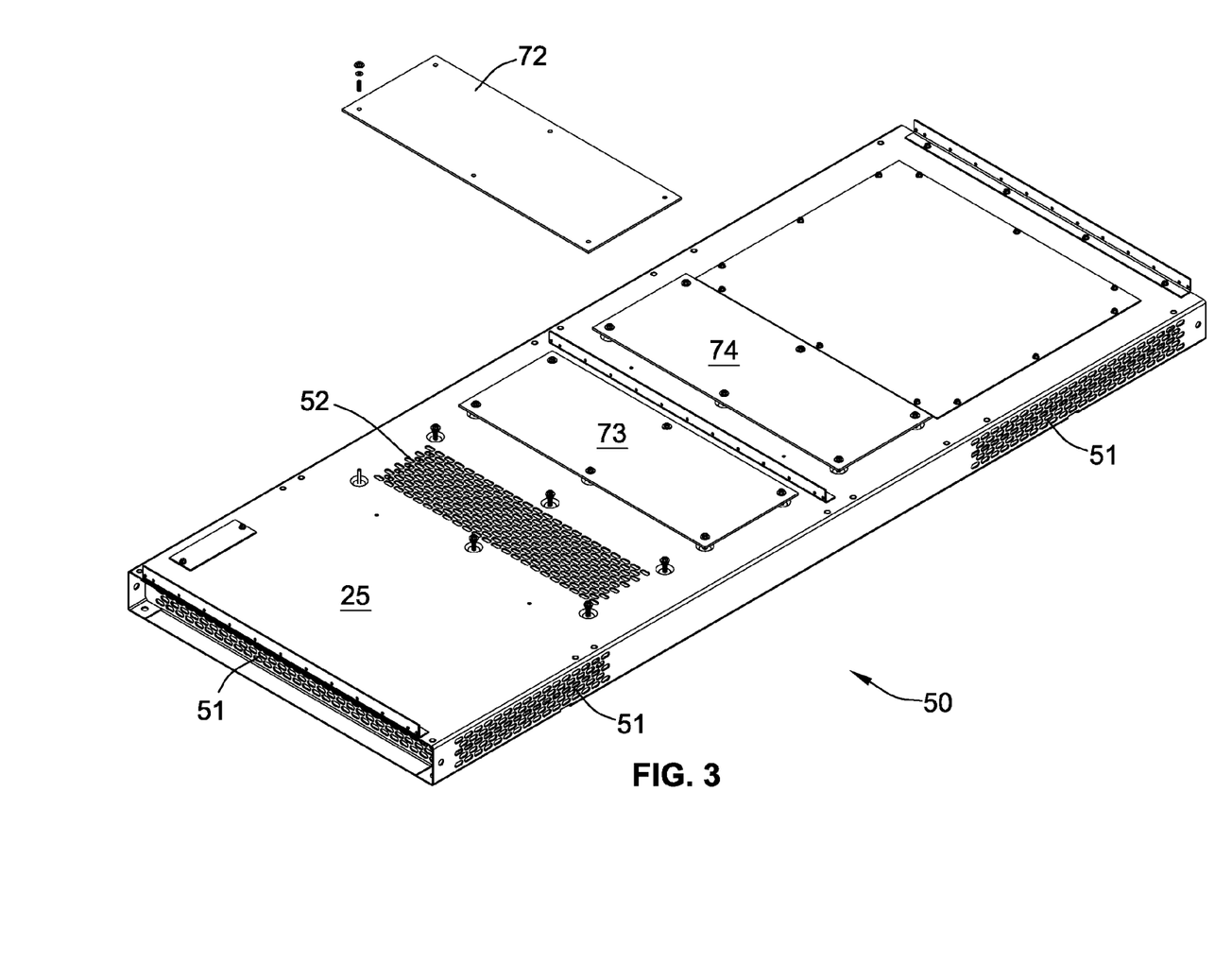
FIG. 3 is an enlarged, partially exploded top perspective view of the ambient air intake manifold at the base of the arc-resistant switchgear enclosure of FIGS. 1 and 2.
Figure 4:
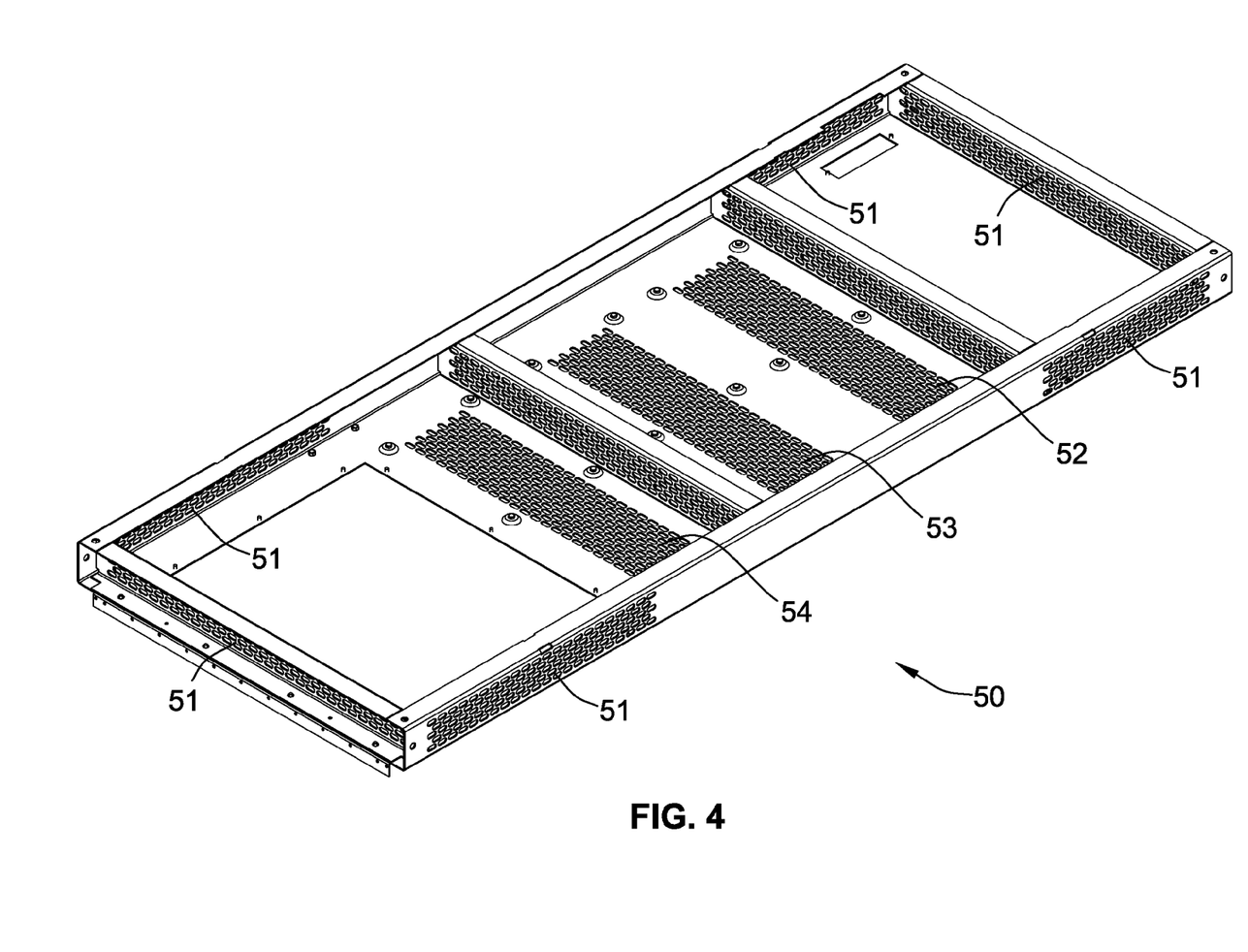
FIG. 4 is a bottom perspective view of the ambient air intake manifold shown in FIG. 3

Turning now to the drawings and referring first to FIGS. 1 and 2, there is shown a switchgear enclosure 10 that includes vertical front and back walls 20 and 21, a pair of vertical side walls 22 and 23 joined to the front and back walls, and top and bottom walls 24 and 25 joined to all the vertical walls 20-23. Mounted on the front wall 20 are upper and lower hinged doors 26 and 27, and the upper door 26 opens into a low-voltage compartment 28 that is isolated from the rest of the interior of the enclosure 10 by partitions 28a and 28b (see FIG. 2). The lower door 27 opens into a circuit breaker compartment 31, which is the first of three higher-voltage compartments 31, 32 and 33. Compartment 32 is a main bus compartment, and compartment 33 is a cable compartment.

In the breaker compartment 31, a circuit breaker (not shown) is plugged into a circuit breaker stab assembly 34 that includes a pair of circuit breaker sockets 34a and 34b which are connected to line-side bus bars 36 located in the main bus compartment 32 and load-side bus bars 37 located in the cable compartment 33. The bus bars 36 are connected to a power-input line from a utility grid, and the bus bars 37 are connected to a load to be furnished with power. It will be noted that a portion of the cable compartment 33 extends under the main bus compartment 32 to be directly adjacent the circuit breaker compartment 31, for connecting the bus bars 37 to the lower circuit breaker socket 34b, through a vertical partition 38. The main bus compartment 32 is located between the breaker compartment 31 and the cable compartment 33, above the extended portion of the cable compartment 33. A vertical partition 39 and a horizontal partition 40 separate compartments 32 and 33. A pair of doors 41a and 41b is mounted on the exterior surface of the back wall 21 to permit access to the cable compartment 33.

As the bus bars 36, 37 and the circuit breaker stab assembly 34 increase in temperature during operation, the air within the compartments 31-33 also increases in temperature. To allow the heated air to naturally rise and exit the compartments 31-33, and thereby remove heat from those compartments, air exhaust ports are provided at or near the tops of the compartments 31-33. As the heated air rises and exits the enclosure 10, the exhausted hot air is replaced by cooler is ambient air that enters each compartment through air-intake openings at or near the bottoms of the compartments 31-33. The replacement air is heated by the switchgear as it rises through the compartments 31-33, thereby continuously removing heat from, and thus cooling, the switchgear.

In the illustrative embodiment, the three compartments 31-33 have respective air exhaust ports 42, 43 and 44 in their top walls, as can be seen in FIGS. 1 and 2. Each of the exhaust ports 42, 43 and 44 is formed by an array of cutouts in the metal panels that form the top walls of the respective compartments 31-33, and which collectively form the top wall 24 of the enclosure 10. This configuration of the air exhaust ports prevents any material larger than the size of the individual cutout openings from entering the enclosure 10. Any particulate material that might enter the enclosure through the small cutout openings is captured in removable trays 45 mounted in the respective compartments 31-33, above the switchgear in those compartments.

Replacement air enters the enclosure 10 from a hollow base 50 beneath the bottom wall 25 of the enclosure. In the illustrative embodiment, the hollow base 50 is coextensive with the width and depth of the switchgear enclosure 10. Ambient air enters the hollow base 50 through multiple air-intake openings 51 formed in the front, back and both end walls of the hollow base 50. Each of the air intake openings is formed by an array of cutouts in the metal panels that form the short vertical walls of the hollow base 50, to prevent debris from entering the hollow base 50. The interior of the hollow base 50 functions as a manifold that distributes the ambient air to air-intake ports 52, 53 and 54 formed in the bottom wall 25 of the enclosure 10, where the ambient air is drawn upwardly into the enclosure 10. The bottom wall 25 of the enclosure 10 also serves as the top wall of the hollow base 50.

As in the case of the exhaust ports 42-44, each of the air-intake ports 52-54 is formed by an array of cutouts in the metal panels that form the bottom wall 25 of the enclosure 10. Associated with each of the ports 52-54 is a movable closure panel which will be discussed below.

The two air-intake ports 52 and 53 are aligned with the breaker compartment 31 so that air can be drawn into this compartment at a relatively high rate, because the single hottest region within the enclosure 10 is typically in the space around the breaker stabs 34a and 34b in the breaker compartment 31. As the relatively cool ambient air flows upwardly from the intake ports 52 and 53 through the breaker compartment 31, the breaker stabs 34a and 34b are cooled by the transfer of heat to the passing air stream, and then the heated air continues to rise and is ultimately exhausted from the enclosure via the large exhaust port 42 in the top wall of the breaker is compartment 31.

Figure 5:
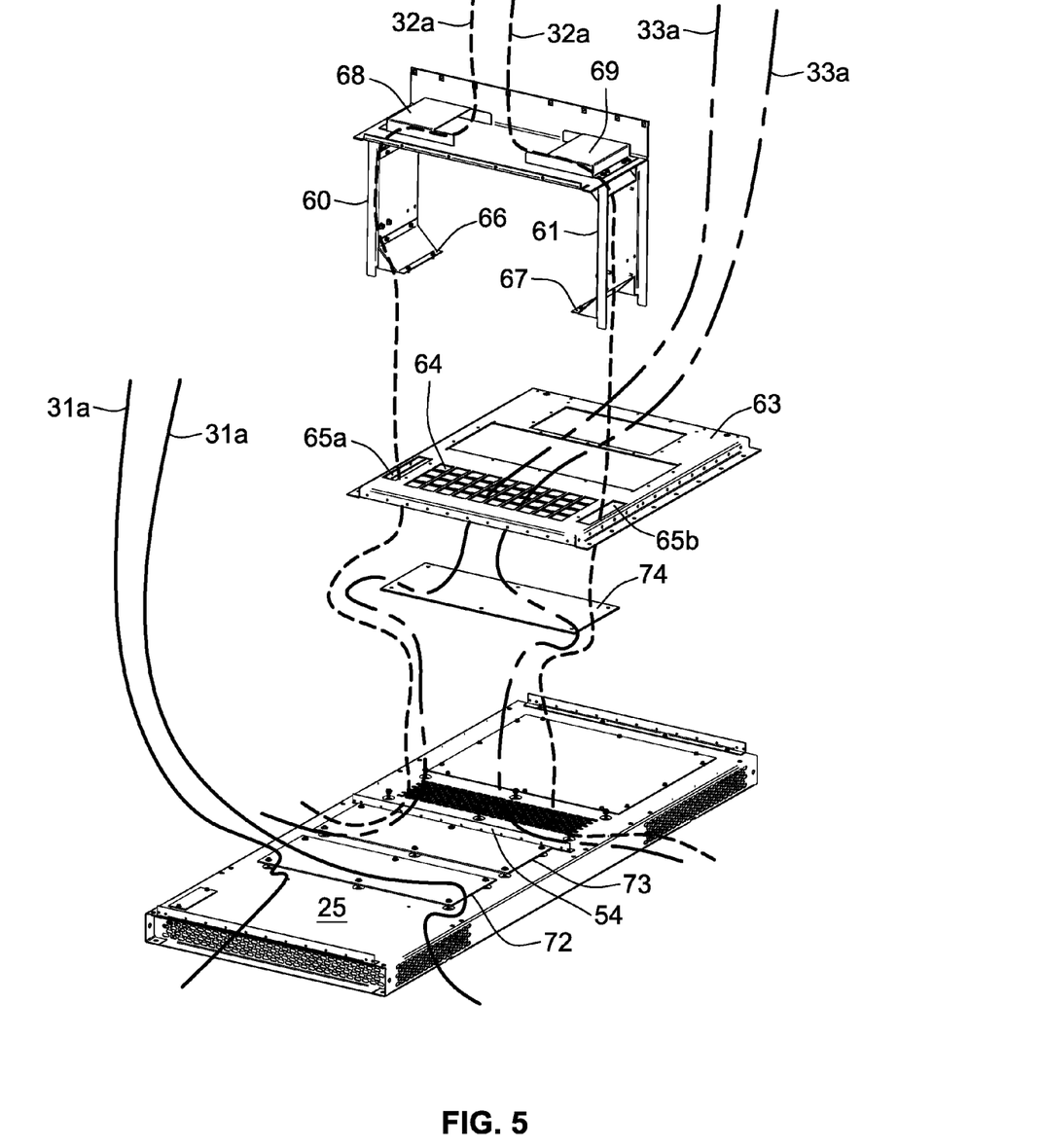
FIG. 5 is a partially exploded top perspective view of a portion of the ambient air ventilation system in the switchgear enclosure of FIGS. 1-4, including the air intake manifold of FIGS. 3 and 4, a hood for attachment to an end portion of the top of the manifold, and a pair of vertical air conduits for conducting air to one of the compartments in the enclosure.
Figure 6:
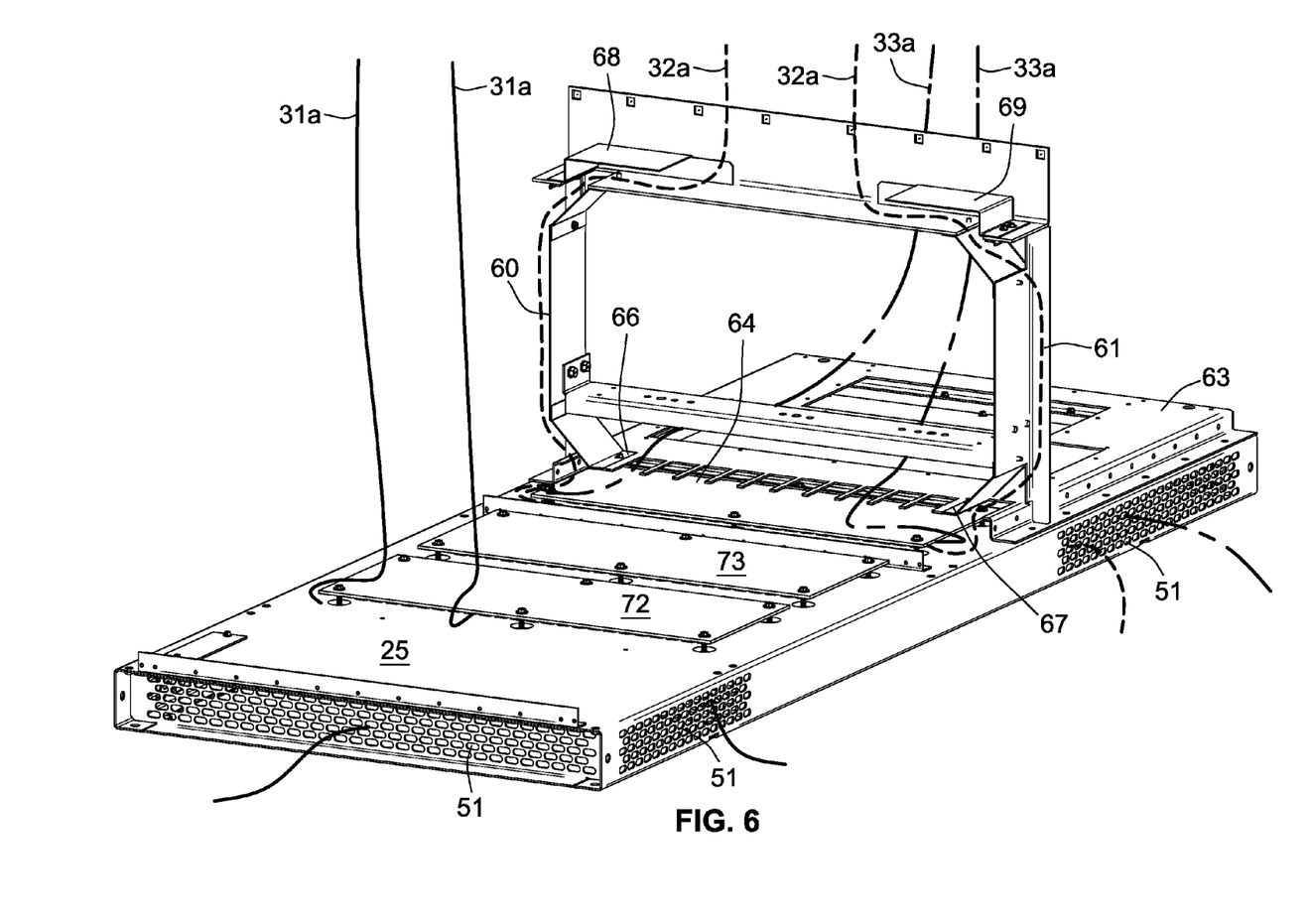
FIG. 6 is an enlarged perspective view of the components shown in FIG. 5, in their assembled positions.
Figure 7:
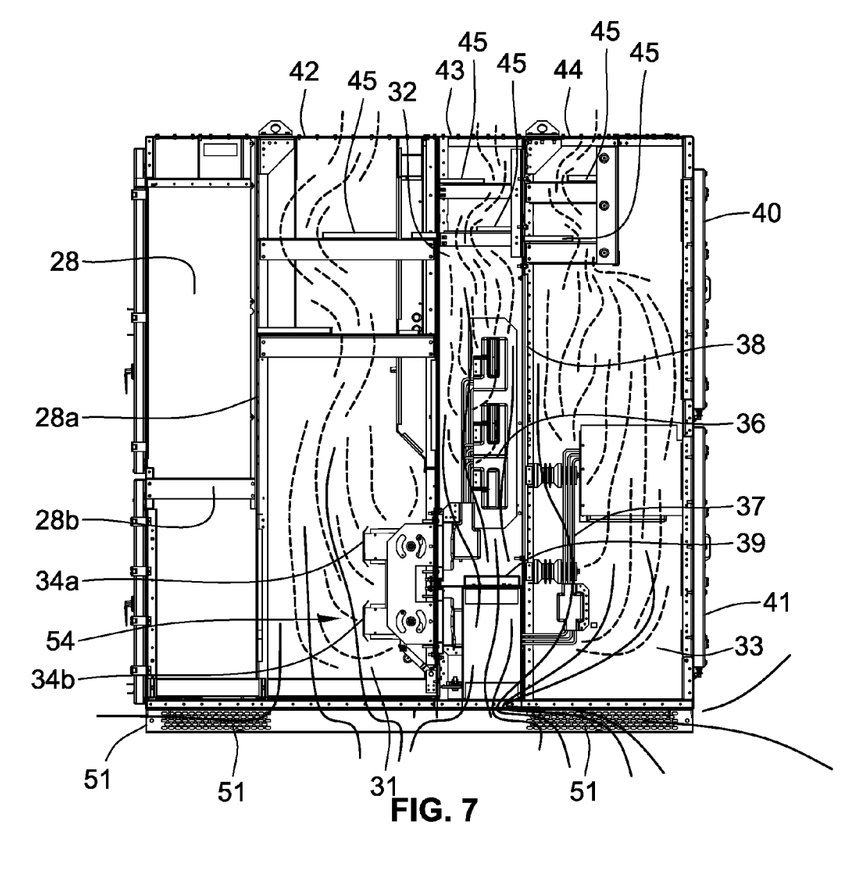
FIG. 7 is a side elevation of the arc-resistant switchgear enclosure of FIGS. 1-6, with the addition of diagrammatic illustrations of the air flow through the ambient air ventilation system.

The third air-entry port 54 opens into the portion of the L-shaped cable compartment 33 that extends under the main bus compartment 32. A portion of the ambient air drawn through the port 54 is channeled to the main bus compartment 32 by a pair of vertical air conduits 60 and 61 extending upwardly from opposite ends of the port 54 to conduct ambient air from the port 54 into the bottom of the main bus compartment 32. The lower ends of the two conduits 60 and 61 are connected to a shallow hood 63 that fits over, and is fastened to, the right-hand portion of the bottom wall 25, including the air-intake port 54. The hood 63 forms an array of cutout openings 64 to allow air from the port 54 to enter the cable compartment 33, and a pair of rectangular openings 65*a* and 65*b* that allow air rising from the port 54 to enter the two conduits 60 and 61, respectively. In FIG. 5, lines 31*a*, 32*a* and 33*a* illustrate the air flow paths from the air-intake ports 52-54 to the respective compartments 31-33. In certain applications, one of the conduits 60 and 61 might be sufficient to maintain the temperature of the main bus compartment below the applicable limit.

Flanges 66 and 67 on the lower ends of the respective conduits 60 and 61 are fastened to the top of the hood 63 so that the only paths from the cable compartment 33 into the main bus compartment require 180-degree vertical turns in the constricted space between the openings 64 and 65*a,b*. The two air streams then pass upwardly through the conduits 60 and 61 and are discharged into the lower region of the main bus compartment 32. A pair of air deflectors 68 and 69 guide the air from the respective conduits 60 and 61 into the central region of the compartment 32, where the most heat is generated because that is where the circuit breaker stabs 34*a* and 34*b* are connected to the bus bars 37.

When an arcing fault occurs within one of the compartments 31-33 in the enclosure 10, the temperature and pressure in that compartment can increase rapidly, and the materials involved in or exposed to the arc produce hot decomposition products, either gaseous or particulate, which should be discharged outside the enclosure. In the illustrative enclosure, such gaseous and particulate materials can only be discharged through the air-exhaust ports in the top wall 24 because the air-intake ports 52-54 are equipped with closure devices that automatically close the air-intake ports in response to the sudden pressure increase that occurs inside the enclosure when an arcing fault occurs. Specifically, the air-intake ports 52-54 are equipped with respective closure panels 72, 73 and 74 that are held open by biasing springs during normal pressure conditions. When the pressure within the enclosure 10 increases due to the occurrence of an arcing fault, that pressure overcomes the spring biasing forces and presses the panels 72-74 down against the upper surface of the bottom wall 25, thereby closing the air-intake ports 52-54. This type of closure device is described in U.S. Pat. No. 5,767,440, which is assigned to the assignee of the present invention.

Figure 8:
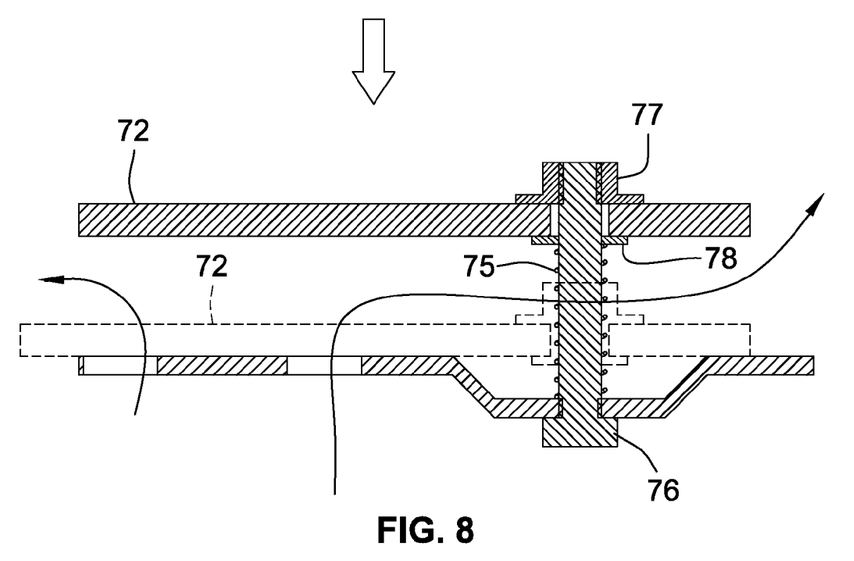
FIG. 8 is an enlarged section of a portion of one of the closure panels in the switchgear enclosure of FIGS. 1-7, in both its open and closed positions.

As can be seen in FIG. 8, spring biasing forces are applied to each of the closure panels 72-74 by multiple compression springs 75 captured on cap screws 76 by nuts 77 and washers 78. The cap screws 76 extend through the panels 72-74 so that each of the panels 72-74 can slide vertically on a set of six of the screws 76. The compression springs 75 normally hold the panels 72-74 in their raised (open) positions where they are vertically spaced from the bottom wall 25 so that ambient air can freely pass through the air-intake ports 52-54. When an arcing fault occurs, the resulting sudden pressure increase inside the enclosure 10 forces the panels 72-74 downwardly, overcoming the upward biasing force of the compression springs 75 and moving the panels 72-74 down into firm engagement with the bottom wall 25. This closes the air-intake ports 52-54 so that there is no risk to personnel or equipment that might be positioned near the exterior openings in the hollow base of the enclosure.

The gases cannot be vented through the front, back or end walls because those walls are all completely closed. Thus, the gases can exit only through the top wall 24, which is not accessible to personnel, or is equipped with an exhaust plenum that receives gases exhausted through the top wall 24 and conducts these gases to a safe exhaust region where personnel are prohibited.

The ambient air ventilation system provided by this invention has been found to be highly effective in cooling switchgear. Tests have demonstrated that the illustrative ventilation system is capable of reducing the temperature within the switchgear enclosure by more than 20° C., or more than 70° F., effectively cooling switchgear capable of handling currents as high as 2000 to 3000 amperes. This temperature reduction can be achieved without the use of any air vents in any of the vertical walls of the enclosure above the hollow base, thereby avoiding the need for movable closure devices on any of the vertical walls of the enclosure.

While particular embodiments and applications of the present invention have been illustrated and described, it is to be understood that the invention is not limited to the precise construction and compositions disclosed herein and that various modifications, changes, and variations will be apparent from the foregoing descriptions without departing from the spirit and scope of the invention as defined in the appended claims.

What is claimed is:

1. An arc-resistant enclosure for electrical switchgear comprising
    solid front and back walls,
    a pair of solid side walls joined to said front and back walls,
    top and bottom walls joined to said side walls and said front and back walls,
    internal partitions dividing the space enclosed by said front, back, side, top and bottom walls into multiple compartments for receiving different types of switchgear,
    said bottom wall forming air-intake ports for admitting ambient air into a plurality of said compartments, and said top wall forming air-exhaust ports for allowing air to be exhausted from said plurality of said compartments, and
    an ambient air manifold below said bottom wall for conducting ambient air to said air-intake ports in said bottom wall.

2. The arc-resistant enclosure of claim 1 in which said compartments include a circuit protection device compartment, a cable compartment, and a main bus compartment between said protection device compartment and cable compartments, and which includes at least one air conduit for conducting ambient air from at least one of said air-intake ports into the bottom of said main bus compartment.

3. The arc-resistant enclosure of claim 1 in which a portion of said cable compartment extends under said main bus compartment to be directly adjacent said circuit protection device compartment, and said at least one air conduit comprises a pair of conduits located adjacent the side walls of said portion of said cable compartment extending under said main bus compartment.

4. The arc-resistant enclosure of claim 3 which includes air deflectors in the bottom region of said main bus compartment for directing air exiting said conduits into the central region of said main bus compartment.

5. The arc-resistant enclosure of claim 1 which includes closure devices associated with said air-intake ports for closing said air-intake ports in response to an increase in air pressure within said enclosure, so that air can be exhausted from said enclosure only through said air-exhaust ports in said top wall as long as said pressure remains increased.

6. The arc-resistant enclosure of claim 1 wherein said bottom wall of said enclosure is the top wall of said air-intake manifold, and said manifold also has a bottom wall spaced below said bottom wall of said enclosure to form an air-intake chamber for receiving ambient air, said air-intake ports opening into said chamber.

7. The arc-resistant enclosure of claim 6 in which said air-intake manifold includes front, back and side walls interconnecting said top and bottom walls of said manifold and including openings for admitting ambient air into said chamber.

8. An arc-resistant enclosure for electrical switchgear comprising
    solid front and back walls,
    a pair of solid side walls joined to said front and back walls,
    top and bottom walls joined to said side walls and said front and back walls,
    internal partitions dividing the space enclosed by said front, back, side, top and bottom walls into multiple compartments for receiving different types of switchgear, said compartments including a circuit protection device compartment, a cable compartment, and a main bus compartment between said circuit protection device and cable compartments, and
    an ambient air manifold for conducting ambient air to the lower regions of all said compartments from below said bottom wall, said top wall forming air-exhaust ports for allowing air to be exhausted from said compartments.

9. The arc-resistant enclosure of claim 8 in which a portion of said cable compartment extends under said main bus compartment to be directly adjacent said circuit protection device compartment, and said ambient air manifold includes a pair of conduits located adjacent the side walls of said portion of said cable compartment extending under said main bus compartment.

10. The arc-resistant enclosure of claim 8 in which said bottom wall forms air-intake ports for admitting ambient air into a plurality of said compartments, and said ambient air manifold is located below said bottom wall for conducting ambient air to said air-intake ports.

11. A method of cooling an arc-resistant enclosure for electrical switchgear that includes solid front and back walls, a pair of solid side walls joined to said front and back walls, and a top and bottom wall joined to said side walls and said front and back walls, a bottom wall joined to said side walls and said front and back walls, and internal partitions dividing the space enclosed by said front, back, side, top and bottom walls into multiple compartments for receiving different types of switchgear, said method comprising
    admitting ambient air into said compartments through the bottom walls of said compartments, and exhausting air from upper regions of said compartments to produce a continuous upward flow of ambient air through said compartments for removing heat from said compartments.

12. The cooling method of claim 11 in which said compartments include a circuit protection device compartment, a cable compartment, and a main bus compartment between said circuit protection device and cable compartments, and a portion of said cable compartment extends under said main bus compartment to be directly adjacent said circuit protection device compartment, and which includes conducting ambient air from at least one air-intake port into the bottom of said main bus compartment.

13. The cooling method of claim 12 which includes conducting ambient air upwardly from said at least one of said intake ports along the front and back walls of said portion of said cable compartment extending under said main bus compartment.

14. The cooling method of claim 13 which includes directing air from the bottom of said main bus compartment into the central region of said main bus compartment.

15. The cooling method of claim 11 which includes closing said air-intake ports in response to an increase in air pressure within said enclosure, so that air can be exhausted from said enclosure only through said air-exhaust ports in said top wall as long as said pressure remains increased.

16. The cooling method of claim 11 which includes accumulating ambient air in a manifold located below said bottom wall of said enclosure and in fluid communication with the lower regions of at least some of said compartments.

* * * * *